(12) United States Patent
Karp (10) Patent No.: US 6,644,944 B2
(45) Date of Patent: Nov. 11, 2003

(54) UNI-DIRECTIONAL FLOW MICROFLUIDIC COMPONENTS

(75) Inventor: Christoph D. Karp, Pasadena, CA (US)

(73) Assignee: Nanostream, Inc., Pasadena, CA (US)

(*) Notice: Subject to any disclaimer, the term of this patent is extended or adjusted under 35 U.S.C. 154(b) by 0 days.

(21) Appl. No.: 09/985,548

(22) Filed: Nov. 5, 2001

(65) Prior Publication Data

US 2002/0081222 A1 Jun. 27, 2002

Related U.S. Application Data (60) Provisional application No. 60/246,312, filed on Nov. 6, 2000.

(51) Int. Cl.[7] .......................... F04B 39/10; F04B 53/10
(52) U.S. Cl. .................... 417/566; 417/413.3; 137/859; 422/103
(58) Field of Search ....................... 417/566, 53, 413.1, 417/413.2, 322, 413.3; 137/824, 597, 859; 428/369, 36.91, 188; 422/103

(56) References Cited

U.S. PATENT DOCUMENTS

| | | | | |
|---|---|---|---|---|
| 5,096,388 A | * | 3/1992 | Weinberg | 417/322 |
| 5,219,278 A | * | 6/1993 | van Lintel | 417/413 R |
| 5,250,263 A | | 10/1993 | Manz et al. | 422/81 |
| 5,681,024 A | * | 10/1997 | Lisec et al. | 251/11 |
| 5,730,187 A | | 3/1998 | Howitz et al. | 137/803 |
| 5,759,014 A | * | 6/1998 | van Lintel | 417/413.3 |
| 5,839,467 A | | 11/1998 | Saaski et al. | 137/501 |
| 5,922,591 A | | 7/1999 | Anderson et al. | 435/287.2 |
| 6,033,191 A | * | 3/2000 | Kamper et al. | 417/322 |
| 6,074,725 A | | 6/2000 | Kennedy | 428/188 |
| 6,136,212 A | * | 10/2000 | Mastrangelo et al. | 216/49 |
| 6,536,477 B1 | * | 3/2003 | O'Connor et al. | 137/833 |

FOREIGN PATENT DOCUMENTS

| | | | | |
|---|---|---|---|---|
| EP | 0789146 A | 8/1997 | | F04B/43/02 |
| WO | WO 97/10435 | 3/1997 | | F04B/19/00 |
| WO | WO 98/14707 | 4/1998 | | F15C/5/00 |
| WO | WO 99/19717 | 4/1999 | | G01N/25/22 |
| WO | WO 99/60397 | 11/1999 | | G01N/33/483 |

OTHER PUBLICATIONS

Schomburg, W.K., et al., "AMANDA—Low–cost production of microfluidic devices," Sensors and Actuators A, vol. 70, Nos. 1–2, pp. 153–158; Elsevier Sequoia S.A., Lausanne, Switzerland (1998).

Shoji, Shuichi, "Fluids for Sensor Systems," Topics in Current Chemistry, vol. 194, pp. 163–188, Springer Verlag, Berlin / Heidelberg, 1998.

* cited by examiner

Primary Examiner—Charles G. Freay
Assistant Examiner—Han L Liu
(74) Attorney, Agent, or Firm—Vincent K. Gustafson; Michael F. Labbee

(57) ABSTRACT

Microfluidic fluid control devices are provided. One microfluidic fluid control device can be used as a uni-directional valve within a microfluidic system. The invention also provides a microfluidic pump mechanism having two uni-directional valves separated by an expandable reservoir. Such devices may be formed in multiple layers and utilize flexible membranes.

21 Claims, 7 Drawing Sheets

UNI-DIRECTIONAL FLOW MICROFLUIDIC COMPONENTS

STATEMENT OF RELATED APPLICATION(S)

This application claims benefit of U.S. patent application Ser. No. 60/246,312, filed Nov. 6, 2000.

FIELD OF THE INVENTION

The present invention relates to the control of fluid flow in microfluidic devices.

BACKGROUND OF THE INVENTION

There has been a growing interest in the manufacture and use of microfluidic systems for acquiring chemical and biological information. In particular, when conducted in microfluidic volumes, complicated biochemical reactions may be carried out using very small volumes of liquid. Among other benefits, microfluidic systems increase the response time of reactions, minimize sample volume, and lower reagent consumption. When volatile or hazardous materials are used or generated, performing reactions in microfluidic volumes also enhances safety and reduces disposal quantities.

Microfluidic devices are becoming more important in a wide variety of fields from medical diagnostics and analytical chemistry to genomic and proteomic analysis. It is difficult or impossible to perform complex fluid handling procedures using currently available microfluidic systems. For example, controlling the direction of fluid flow within a device, or achieving complex fluid flow patterns inside microfluidic devices is difficult to achieve using current technology. As microfluidic systems become more widely used, the tasks that they will perform will become increasingly complex.

There is a need in the field of microfluidics to provide microfluidic systems with components that can control fluid flow within a microfluidic device and, more particularly, for devices capable of providing uni-directional fluid flow. It would be particularly desirable for such a device to be able to be prototyped and modified quickly so as to enable rapid device optimization. These and other needs and desirable aspects are addressed herein.

SUMMARY OF THE INVENTION

In one separate aspect of the invention, a microfluidic fluid control device includes a first or inlet channel having a valve seat disposed therein at a valve region and a second or outlet channel with a flexible membrane separating the first channel and the second channel. The flexible membrane has an aperture aligned with the valve seat at a valve region. The aperture can be smaller than a seating surface of the valve seat. The flexible membrane can form a seal with the valve seat.

The microfluidic fluid control devices of the invention can be constructed to allow fluid flow in one direction, but substantially block fluid flow in the opposing direction. A microfluidic fluid control device may also include a second valve seat disposed in the second channel.

In another separate aspect of the invention, a microfluidic pump includes a first fluid control device and a second fluid control device as summarized above, wherein the first and second control devices are oriented such that fluid can flow in only one direction through the device. The microfluidic pump further includes an expandable reservoir separating the first fluid control device and the second fluid control device. The pump may further include an actuator for moving the deformable membrane.

In another aspect, any of the foregoing separate aspects may be combined for additional advantage.

These and other aspects and advantages of the present invention will become apparent from the following detailed description of the preferred embodiments taken in conjunction with the figures.

DETAILED DESCRIPTION OF PREFERRED EMBODIMENTS OF THE INVENTION

Definitions

The term "channel" as used herein is to be interpreted in a broad sense. Thus, it is not intended to be restricted to elongated configurations where the transverse or longitudinal dimension greatly exceeds the diameter or cross-sectional dimension. Rather, such terms are meant to comprise cavities or tunnels of any desired shape or configuration through which liquids may be directed. Such a fluid cavity may, for example, comprise a flow-through cell where fluid is to be continually passed or, alternatively, a chamber for holding a specified, discrete amount of fluid for a specified amount of time. "Channels" may be filled or may contain internal structures comprising valves or equivalent components.

The term "microfluidic" as used herein is to be understood, without any restriction thereto, to refer to structures or devices through which fluid(s) are capable of being passed or directed, wherein one or more of the dimensions is less than 500 microns.

The term "stencil" as used herein refers to a material layer that is preferably substantially planar, through which one or more variously shaped and oriented portions has been cut or otherwise removed through the entire thickness of the layer, and that permits substantial fluid movement within the layer (e.g., in the form of channels or chambers, as opposed to simple through-holes for transmitting fluid through one layer to another layer). The outlines of the cut or otherwise removed portions form the lateral boundaries of microstructures that are formed upon sandwiching a stencil between substrates and/or other stencils.

Fabrication of Microfluidic Devices

Microfluidic devices providing unidirectional flow control utility according to the present invention may be fabricated in various ways using a wide variety of materials. In an especially preferred embodiment, microfluidic devices according to the present invention are constructed using stencil layers to define channels and/or chambers. As described in further detail in co-pending U.S. patent application Ser. No. 09/453,029 filed Dec. 1, 1999, which is hereby incorporated by reference as if fully set forth herein, a stencil layer is preferably substantially planar and has microstructure cut through the layer. For example, a computer-controlled plotter modified to accept a cutting blade may be used to cut various patterns through a material layer. Alternatively, a computer-controlled laser cutter may be used. As further alternatives, conventional stamping, cutting, and/or molding technologies may be employed to form stencil layers. The wide variety of materials that may be used to fabricate microfluidic devices using sandwiched stencil layers include polymeric, metallic, and/or composite materials, to name a few. Notably, use of stencil-based fabrication methods enables a particular device design to be rapidly "tuned" or optimized for particular operating parameters, since different material types and thicknesses may be readily used and/or substituted for individual layers within a device. The ability to prototype devices quickly with stencil fabrication methods permits many different variants of a particular design to be tested and evaluated concurrently.

When assembled in a microfluidic device, the top and bottom surfaces of stencil layers may mate with one or more adjacent stencil or substrate layers to form a substantially enclosed device, typically having one or more inlet ports and one or more outlet ports. In one embodiment, one or more layers of a device are comprised of single- or double-sided adhesive tape, although other methods of adhering stencil layers may be used. A portion of the tape (of the desired shape and dimensions) can be cut and removed to form channels, chambers, and/or apertures. A tape stencil can then be placed on a supporting substrate, between layers of tape, or between layers of other materials. In one embodiment, stencil layers can be stacked on each other. In this embodiment, the thickness or height of the channels can be varied by varying the thickness of the stencil (e.g. the tape carrier and the adhesive material thereon) or by using multiple substantially identical stencil layers stacked on top of one another. Various types of tape are useful with this embodiment. Suitable tape carrier materials include but are not limited to polyesters, polycarbonates, polytetrafluoroethlyenes, polypropylenes, and polyimides. Such tapes may have various methods of curing, including curing by pressure, temperature, or chemical or optical interaction. The thicknesses of these carrier materials and adhesives may be varied.

Alternatively, microfluidic devices according to the present invention are fabricated from materials such as glass, silicon, silicon nitride, quartz, or similar materials. Various conventional machining or micromachining techniques such as those known in the semiconductor industry may be used to fashion channels, vias, and/or chambers in these materials. For example, techniques including wet or dry etching and laser ablation may be used. Using such techniques, channels, chambers, and/or apertures may be made into one or more surfaces of a material or penetrate through a material. Still further embodiments may be fabricated from various materials using well-known techniques such as embossing, stamping, molding, and soft lithography.

Specific examples of suitable techniques for the manufacture of device according to the present invention and related references include: silicon etching (Manz et al. (Trends in Anal. Chem. (1990) 10(5): 144–149; Advances in Chromatography (1993) 33: 1–66), molding (see, e.g., Duffy et al., Analytical Chemistry (1998) 70: 4974–4984; McCormick et al., Analytical Chemistry (1997) 69: 2626–2630), LIGA (see, e.g., Schomburg et al., Journal of Micromechanical Microengineering (1994) 4: 186–191), hot-embossing, imprinting in polymethylmethacrylate (PMMA; see, e.g., Martynova et al., Analytical Chemistry (1997) 69: 4783–4789), and microcontact printing technology (U.S. Pat. No. 5,512,131). Any of these or other suitable manufacturing techniques can be combined to give a device of the invention. The layers of the device containing channels can be made of any material suitable with the manufacture of devices with at least one feature size smaller than 500 microns including, for example, polymers, silicon, glasses, ceramics, wood or metal. As noted previously, in preferred embodiments a device is constructed mainly from polymeric materials.

In addition to the use of adhesives or single- or double-sided tape discussed above, other techniques may be used to attach one or more of the various layers of microfluidic devices useful with the present invention, as would be recognized by one of ordinary skill in attaching materials. For example, attachment techniques including thermal, chemical, or light-activated bonding; mechanical attachment (such as using clamps or screws to apply pressure to the layers); or other equivalent coupling methods may be used.

Uni-directional Flow Devices

To aid in controlling fluid flow within microfluidic systems, the present invention provides various unidirectional flow devices. In one embodiment, such a device can act as a uni-directional flow valve. The device has an inlet channel having a valve seat disposed therein. The device also has an outlet channel separated from the inlet channel by a flexible membrane. The flexible membrane defines an aperture that is substantially aligned with the valve seat in the first channel. In one embodiment, a second valve seat in the outlet channel may be provided.

The microfluidic fluid control device can provide a controllable unidirectional flow within a microfluidic device. In one embodiment, the valve state is normally closed in the absence of fluid flow, with the membrane resting against the valve seat. When fluid pressure is applied to the membrane from the inlet channel, the membrane is lifted away from the valve seat toward the outlet channel, and fluid is permitted to pass through the membrane aperture and into the outlet channel. The application of fluid pressure in the opposite direction (i.e., from the outlet channel) cannot open the valve, because such pressure is incapable of lifting the valve membrane away from the valve seat. In another embodiment, the valve seat does not contact the flexible membrane in the normal or neutral state. In such an embodiment, the pressure within the inlet and outlet channels of the device may be substantially equal.

A flexible membrane can be of any suitable material that is flexible and compatible with the fluid used in the system. The membrane is preferably a polymeric membrane, including, for example, latex, rubber, polyesters, polycarbonates, polyalkanes (e.g., polyethylenes, polypropylenes and polyethylene terephthalate), polyalkenes, polytetrafluoroethylenes, polypropylenes, polyimides (e.g., KAPTON®), polymethylmethacrylates, silicones, and polyesters (e.g., MYLAR®). Preferably, the membrane material is selected to be impermeable to the solvent being used (e.g., in many biochemical applications, water), to be flexible, and to be sufficiently elastic to return to a neutral state after deformation.

The thickness of the membrane also can be used to tune the response of the fluid control device. Generally, the thicker the membrane that is used, the greater it resists deformation such as may result from the application of pressure. A thicker membrane can be used, for example, to prevent deformation of the flexible membrane 107 in FIG. 1C to the point of contacting layer 100, which defines the upper surface of channel 105.

The size of the valve region also will determine the degree to which a valve membrane can deform. For example, in FIG. 1A, device layer 102 forms the flexible membrane. The flexible membrane 102 can only deform substantially at the valve region, namely at enlarged portions 105A and 106A of the inlet and outlet channels 105 and 106, because it is restrained from substantial deformation elsewhere. Generally, for a given membrane material and thickness, larger channels at the valve region require less pressure to open and close the fluid control device.

The height of the inlet and outlet channels at the valve region also will affect the characteristics of the fluid control device. For example, an outlet channel with a large height can be used when it is desired to limit the deformation of the flexible membrane so that flow in the direction from inlet to outlet is not hindered.

The aperture defined in the membrane can be of any suitable size or shape. It is generally desirable, however, for the aperture to be smaller than the seating surface of the valve seat to promote effective sealing between the flexible membrane and the valve seat.

The valve seat can be constructed from any suitable material or combination of materials. The valve seat may be formed as an integral part of one or more device layers or may be affixed to a surface of the device within a channel. In one embodiment, the valve seat is formed using single-sided adhesive tape material, or double-sided tape with a seating surface affixed to one side. The valve seat can also be formed as a raised portion of the substrate using fabrication techniques such as machining, molding, etching, or hot-pressing. The valve seat may also be formed by depositing a hardenable polymer onto a substrate. In a preferred embodiment, neither the sealing surface of the flexible membrane (the surface that will contact the valve seat) nor the sealing surface of the valve seat (the surface that will contact the flexible membrane) is an adhesive surface.

The valve seat may be constructed in of any shape that allows for the formation of a seal with the flexible membrane when sufficient pressure is applied from the outlet channel. The size and shape of the valve seat may be selected to be compatible with that of the aperture in the membrane. In the examples shown in the figures, the valve seat is cylindrical; however, the seat also could be conical, rectangular, curved, or have a more complex shape, so long as a seal can be formed with the flexible membrane. The seating surface of the valve seat preferably has surface properties to promote sealing with the flexible membrane when sufficient pressure is applied from the outlet channel. In a preferred embodiment, the upper surface or seating surface of the valve seat is formed of a substantially smooth material. In yet another embodiment, the seating surface of the valve seat may be formed with or coated with a tacky material to improve sealing.

In a preferred embodiment, the layer or layers to which the valve seat is attached are substantially inflexible. This can be accomplished by constructing the device from a substantially rigid material such as etched silicon. The layers defining the inlet channel also can be flexible materials such as flexible tapes or molded polymers. In such an embodiment, it is preferred that the flexible layers are adhered to a substantially rigid layer. For example, in FIG. 1A, layer 103 may be constructed from a layer of flexible polymer tape and layer 104 may be constructed from a layer of rigid material such as, for example, a rigid polymeric material (e.g., polycarbonate), metal, ceramic, or glass. Since even rigid materials can exhibit surprising flexibility when provided in sufficiently thin sheets, the thickness of any "rigid" layer described herein should be selected to provide appropriate support.

Figure 1A:
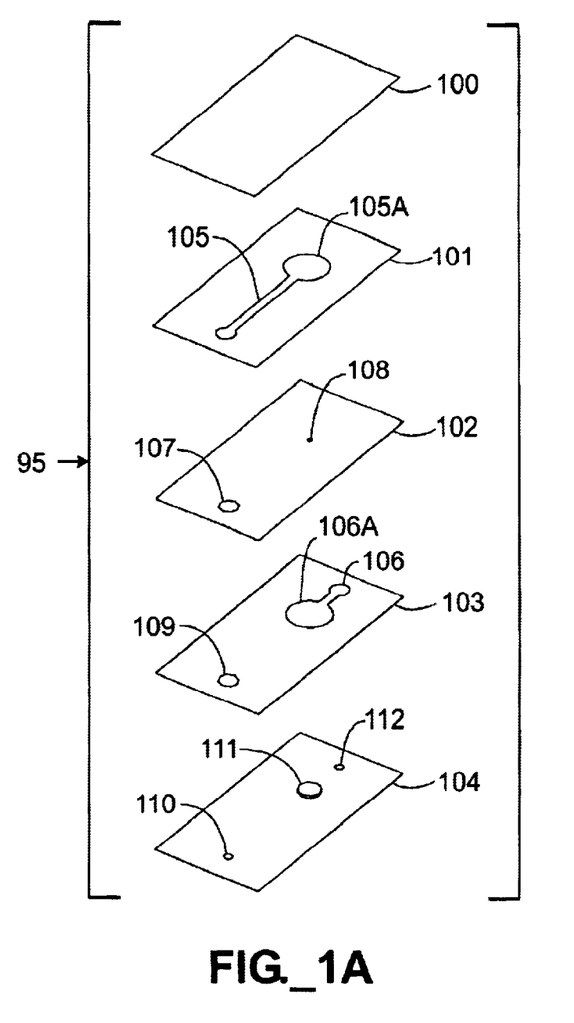
FIG. 1A is an exploded perspective view of a five-layer microfluidic device having a uni-directional valve.
Figure 1B:
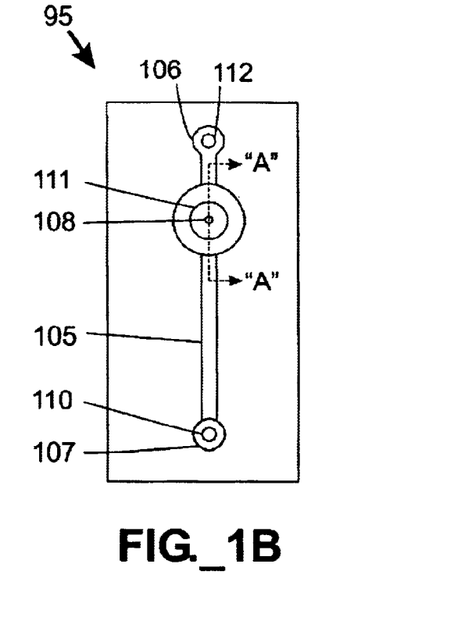
FIG. 1B is a top view of the assembled device of FIG. 1A.

Referring to FIGS. 1A–1B, a microfluidic unidirectional flow device 95 according to one embodiment is provided. The illustrated device 95 is preferably constructed using a stencil fabrication technique from five device layers 100–104. A valve seat 111 is affixed or otherwise formed with the first layer 104, which defines an inlet port 112 and an outlet port 110. The first layer 104 is preferably rigid. The second layer 103 is a stencil layer defining a channel segment 106 having an enlarged chamber region 106A that will surround the valve seat 111 after assembly of the device 95. The second and third layers 103, 102 define large vias 109, 107 that permit fluid flow between the first and fourth layers 104, 101. The third layer 102 is formed of a flexible membrane and also defines one aperture 108 adjacent to the valve seat 111. The fourth layer 101 defines an elongate channel segment 105 having an enlarged region 105A disposed above the aperture 108 and corresponding enlarged chamber region 106A. The chamber region 105A provides space into which the flexible membrane 102 may expand upon application of sufficient fluid pressure through the inlet port 112. The fifth layer 100 serves as a cover to enclose the elongate channel 105, and is preferably formed of a rigid material.

The assembled device 95 is shown in FIG. 1B. In this example, the stencil layers 103, 101 were constructed from double-sided rubber-adhesive polypropylene tape, approximately 0.006" (150 microns) thick, and the third layer 102 was constructed using polyethylene terephthalate (PET) approximately 0.002" (50 microns) thick. The valve seat 111 was formed using a 0.15" (3.8 mm) diameter, 0.0035" (87 microns) thick piece of double-sided acrylic-adhesive polyester tape, with a layer of latex bound to the top; the total valve seat height was roughly 0.006" (150 microns).

Figure 1C:
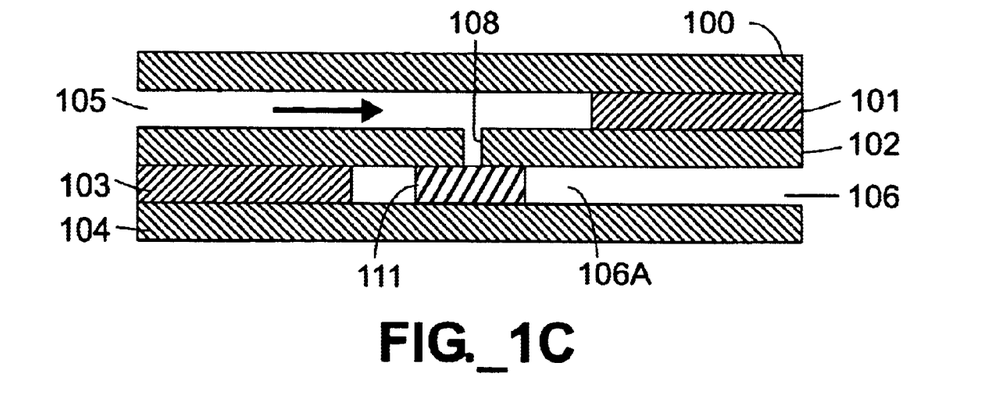
FIGS. 1C–1D are cross-sectional views of a portion of the device depicted in FIGS. 1A–1B along section lines "A–A" provided in FIG. 1B, showing two different states of operation of the unidirectional valve.
Figure 1D:
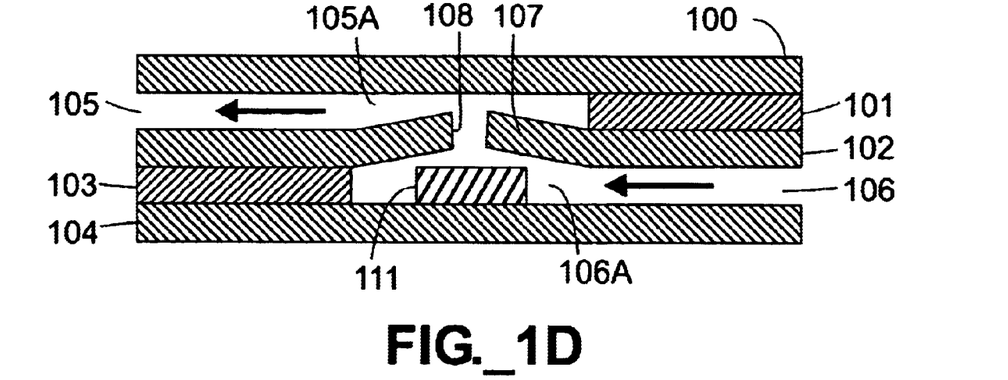

FIGS. 1C–1D are cross-sectional views of a portion of the device 95 in use. In FIG. 1C, fluid is injected through the outlet port 110, and passes through large vias 109 and 107 into the elongate channel 105. When the fluid reaches the aperture 108 in the membrane 102, the fluid contacts the valve seat 111. The aperture 108 is smaller than the diameter of the valve seat 111. Accordingly, since the membrane 102 defining the aperture rests upon the valve seat 111, the membrane 102 forms seals against the valve seat 111 and fluid passage in the direction of the valve seat 111 is blocked. In this particular example, if liquid is used as the working fluid, the liquid may not even reach the valve seat 111, since as it is injected into the device 95, air within the channel 105, chamber region 105A, and large vias 107, 109 may be compressed ahead of the liquid front sufficiently to seal the membrane 102 against the valve seat 111, thus providing a trapped air pocket ahead of the liquid front. An important note is that even drastically increasing the pressure in this example will not cause leakage through the valve, because pressure introduced to the device through the outlet port 110 it simply forces the membrane 102 adjacent to the chamber regions 105A, 106A into tighter contact against the valve seat 111.

FIG. 1D provides a second example of operation of the device 95, in which fluid is injected into the inlet port 112. From the inlet port, the fluid passes into the channel segment 106 and the enlarged chamber region 106A. In this example, as the fluid pressure is increased, stencil layer 102 can be deformed upward into the chamber region 105A, since the membrane 102 is constructed from a flexible material, which in this case is 0.002" (50 microns) thick PET. Upward deformation of the membrane 102 opens a flow path that permits fluid in the chamber 106A to flow through the aperture 108, through the chamber 105A and channel 105, and ultimately to the outlet port 110.

Microfluidic fluid control structures also can be combined in devices to create more complex fluidic devices. For instance, multiple devices can be combined in serial or in parallel. In one example, two microfluidic control regions can be combined in series to form a pump mechanism. The pump mechanism has two unidirectional valves arranged such that their flow directions are aligned. The two unidirectional valves are separated by an expandable reservoir area. The expandable reservoir area can be any substantially sealed reservoir having a changeable volume. As will be appreciated by one skilled in the art, a wide variety of variable-volume reservoir devices may be provided. For example, in one embodiment the expandable reservoir may include a piston/cylinder assembly. In another embodiment, the expandable reservoir may include a deformable pump membrane, the deformation of which changes the volume of the expandable reservoir. Expanding the pump membrane to enlarge the reservoir draws fluid in through one valve, while tightly sealing the other valve. Contracting the membrane to compress the reservoir then seals the input valve, and the fluid flows through the outlet valve.

Figure 2A:
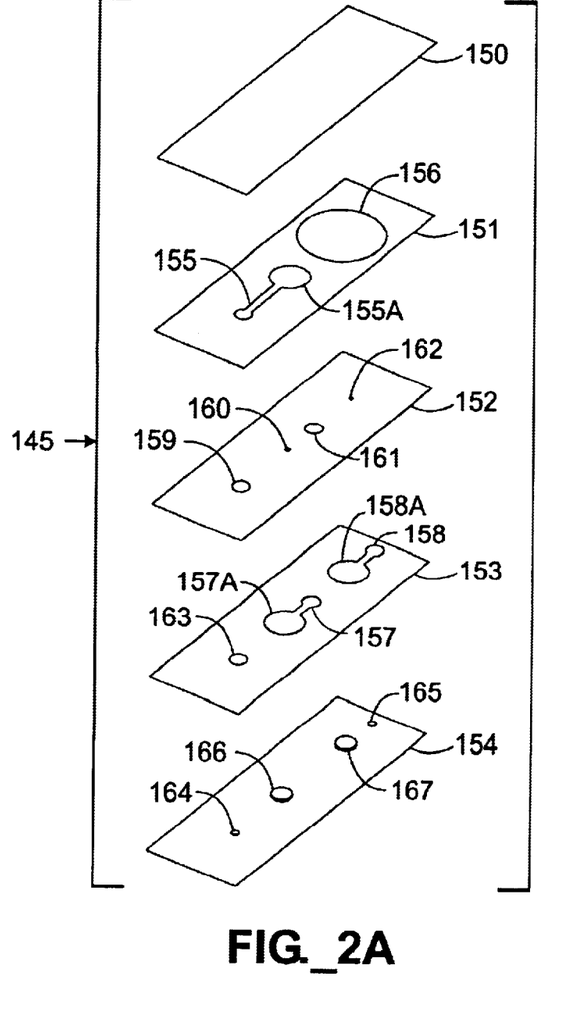
FIG. 2A is an exploded perspective view of a five-layer microfluidic device having two unidirectional valves and capable of being used as a pump.
Figure 2B:
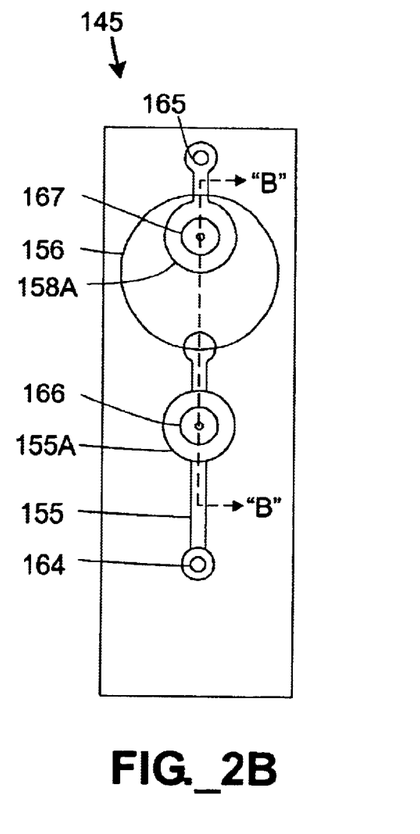
FIG. 2B is a top view of the assembled device of FIG. 2A.

A pump mechanism may also include an actuator for moving the deformable pump membrane. The actuator may be physically attached to the deformable membrane by way of a structure such as, for example, a piston, lever, solenoid, etc. The actuator may also include an enclosed chamber having as one side the deformable pump membrane and having a pressure regulation device. The pressure regulation device may include a positive pressure pump, a vacuum pump, or the like, such that pressure change causes deformation of the membrane A microfluidic device incorporating the uni-directional valves discussed above may be used for pumping fluid. Referring to FIG. 2A, a microfluidic device 145 is constructed in five layers 150–154 including stencil layers 151, 153. Two valve seats 167, 166 are affixed to or otherwise formed on the first layer 154, which also defines an inlet port 165 and an outlet port 164. The second layer 153 define a channel 158 having a chamber 158A, a channel 157 having a chamber 157A, and a large via 163. The third layer 152 defines apertures 162, 160 and large vias 159, 161. The fourth layer 151 defines a large chamber 156 and a channel region 155 having a chamber 155A. The fifth layer 150, which preferably is a flexible membrane, encloses the microstructures defined in the fourth layer 151. The assembled device is shown in FIG. 2B. In this example, the stencil layers 153, 151 were constructed from double-sided rubber-adhesive polypropylene tape approximately 0.006" (150 microns) thick, and the central layer 152 was 0.002" (50 microns) thick PET. The valve seats 167, 168 were formed of a 0.15" (3.8 mm) diameter and 0.0035" (87 microns) thick piece of double-sided acrylic-adhesive polyester tape, with a layer of latex bound to the upper adhesive surface to generate valve seats 167, 168 roughly 0.006" (150 microns) high.

Figure 2C:
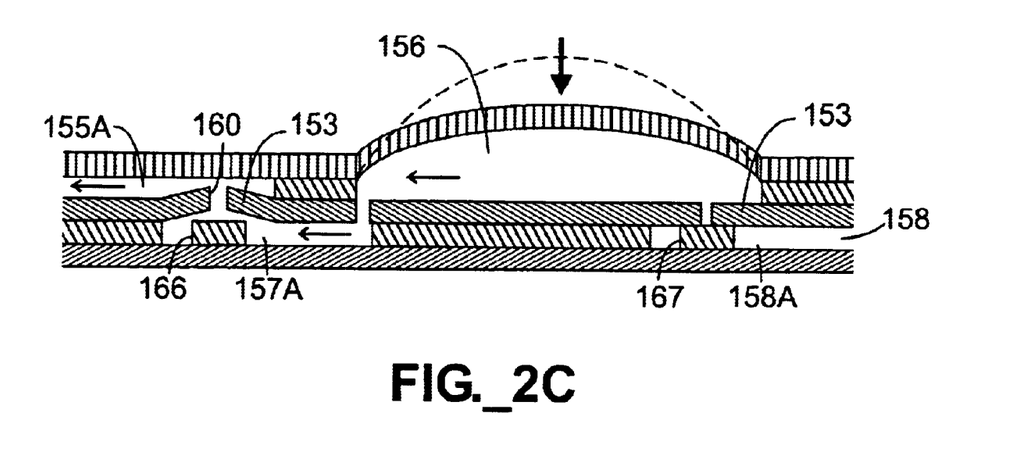
FIG. 2C is a cross-sectional view of a portion of the device depicted in FIGS. 2A–2B in a first state of operation, having a diaphragm in a lower position.
Figure 2D:
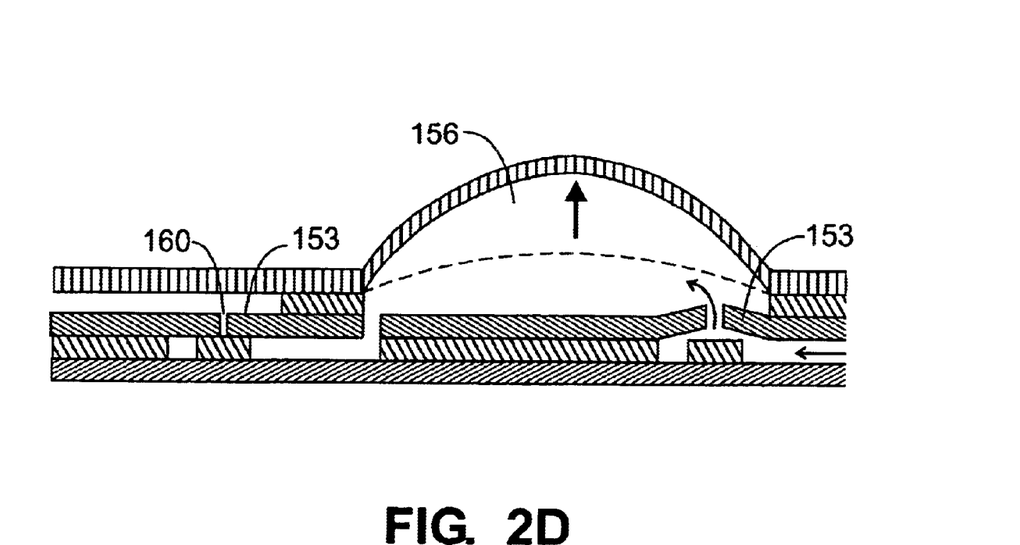
FIG. 2D illustrates the same cross-sectional view as FIG. 2C, but with a diaphragm in a raised position. In both FIGS. 2C–2D, bold arrows indicate the direction of movement of the diaphragm, while the normal arrows indicate the direction of fluid flow within the device.

FIGS. 2C–2D provide cross-sectional views a portion of the device 145 in operation. FIG. 2C illustrates a pump stroke of the device 145. There, it is assumed that the large chamber 156 is initially filled with fluid and that the membrane 150 begins in an upwardly deformed position (represented by the dashed line) above the chamber 156. Downward compression of the membrane 150 in the vicinity above the large chamber 156, as represented by the bold downward arrow, raises the pressure in the large chamber 156 and downstream channel 157, thus causing upward deformation of the central layer 152 in the vicinity of the downstream valve seat 166. Separation of the central layer 152 from the valve seat 166 opens a flow path for the fluid, permitting the fluid to escape into the chamber 155A, and (as shown in FIGS. 2A–2B) ultimately through the large vias 159, 163 and the exit port 164. Notably, downward movement of the membrane 150 also serves to tightly seal the central layer 152 against the upstream valve seat 167, ensuring that all of the fluid leaving the chamber 156 flows toward the outlet port 164 (in the direction of the small arrows). FIG. 2D illustrates a draw stroke of the device 145. There, it is assumed that the membrane 150 begins in a compressed position, as represented by the dashed line. When the membrane 150 is drawn upward, as represented by the bold upward arrow, a low pressure region is created in the large chamber 156. This low pressure region causes the central layer 152 to close tightly against downstream valve seat 166, and also causes the central layer 152 to deform upward away from the upstream valve seat 167, thus permitting fluid to flow through the aperture 162 into the chamber 156. Repeated expansion and compression of the chamber 156 caused by movement of the flexible membrane 150 thus generates pumping action through the device 145.

Figure 3A:
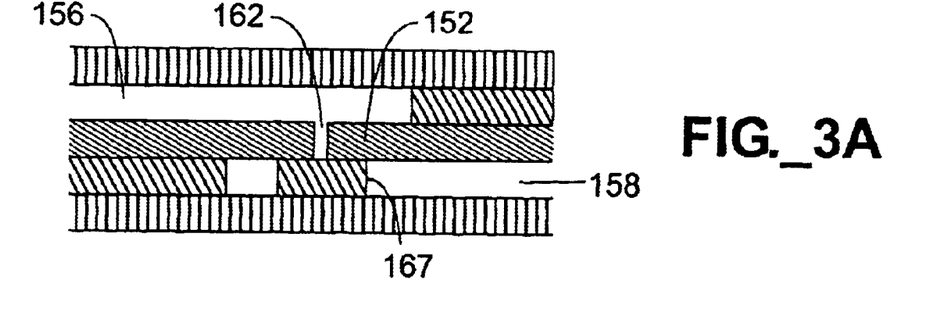
FIG. 3A is a cross-sectional view of a portion of the microfluidic fluid control device depicted in FIGS. 2C–2D with a valve seat having a height substantially equal to the height of the channel surrounding the seat.

Referring to FIG. 3A, a cross sectional view of a portion of the valve segment from the right side of FIG. 2C is shown. In this embodiment, the height of the valve seat 167 is the same as the channel 158. In this embodiment, when the pressure in channel 156 is higher than channel 158, the central layer 152 defining the aperture 162 is pushed down onto the valve seat 167, thus preventing the flow of fluid therethrough. When the pressure in the channel 158 is higher that in channel 156, the central layer 152 defining the aperture 162 can be deformed upward into the channel 156, thus permitting fluid to flow through the aperture 162 from the channel 158 into the channel 156. A slight pressure may be required to move the central layer 152 adjacent to the aperture 162 off of the valve seat 167. Additionally, if the pressure difference is too great, the central layer 152 along the aperture 162 may be pushed upward so far as to contact the top layer 150 defining the upper surface of the channel 156, which may inhibit fluid flow.

Figure 3B:
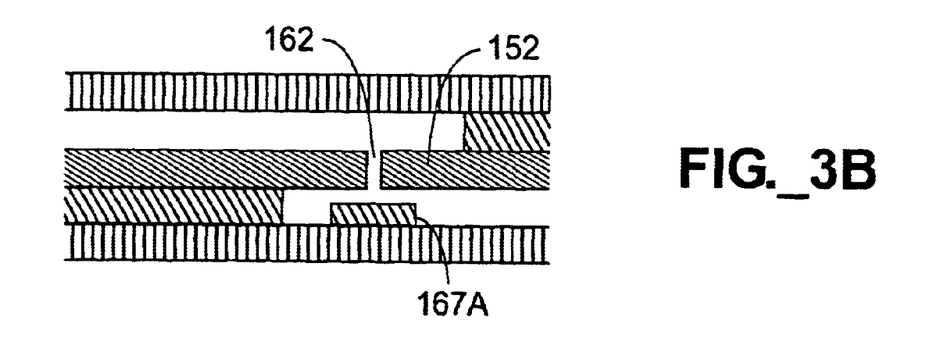
FIG. 3B illustrates the same cross-sectional view as FIG. 3A, but the illustrated device has a valve seat with a height that is substantially lower than the height of the surrounding channel.

Another valve seat embodiment is shown in FIG. 3B. In this embodiment, the valve seat 167A is shorter that the height of the channel 158. In this embodiment, when the pressure in the channel 156 is slightly higher than in the channel 158, fluid may actually flow from channel 156 to 158. When the pressure in 156 becomes sufficiently high, the central layer 152 adjacent to the aperture 162 will be pushed downward and come into contact with valve seat 167A, thus disallowing fluid flow through the aperture 162. The pressure at which this contact occurs may be adjusted by varying the materials and dimensions of the membranes and valve seats. When the pressure in the channel 158 is higher than in the channel 156 (by even a small amount) fluid will flow through the aperture 162 into channel 156. As the pressure in the channel 158 is increased, fluid will continue to flow, unless the central layer 152 adjacent to the aperture 162 membrane containing the through-hole 153 come into contact with the top of channel 156 as described above.

Figure 3C:
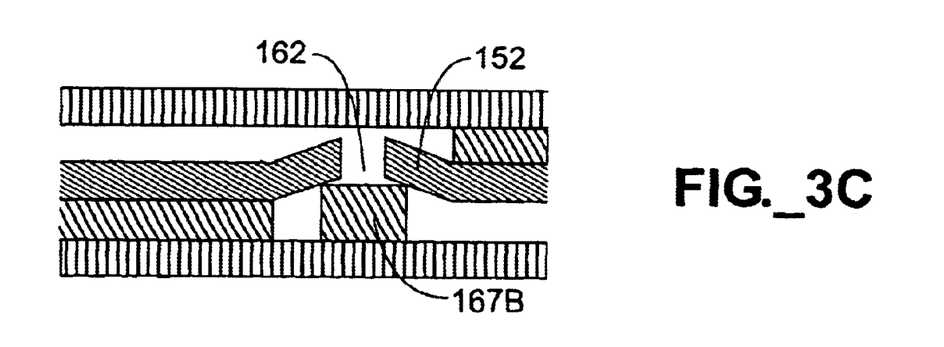
FIG. 3C illustrates the same cross-sectional view as FIGS. 3A–3B, but the illustrated device has a valve seat with a height that is substantially higher than the height of the surrounding channel.

Another embodiment is shown in FIG. 3C. In this embodiment, the valve seat 167B is taller than the channel 158. Absent the application of a pressure differential between the channels 156 and 158, fluid will not flow through the aperture 162. When the pressure in the channel 158 is only slightly greater than in the channel 156, the stressed central layer 152 adjacent to the aperture 162 will not lose contact from the valve seat 167A and the valve will remain closed. As the pressure in 158 is further increased, the central layer 152 adjacent to the aperture 162 will eventually lose contact with the valve seat 167B, thus opening the valve and permitting fluid to flow from the channel 158 to the channel 156.

Similar effects can be produced by altering the geometry and shape of the valve seat, the chemical composition of the valve seat and valve seat surface, and the placement of the valve seat relative to the inlet channels, exit channels, and apertures 162 or 160. Additionally, the height, weight, and chemical composition of the channels can alter the performance, as can the size and placement of the through holes.

Figure 4:
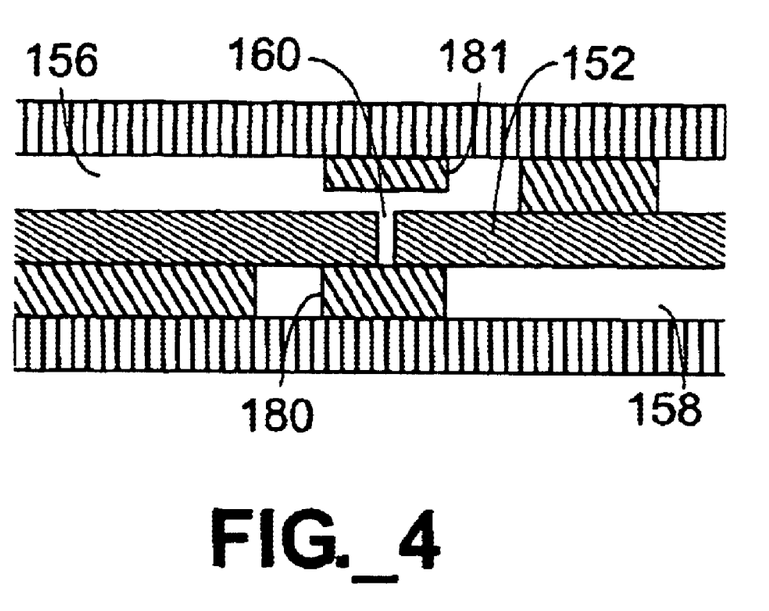
FIG. 4 is a cross-sectional view of a portion of a microfluidic fluid control device having valve seats in each of in two channels separated by a flexible membrane, the valve seats both being positioned adjacent to an aperture formed in the membrane.

In yet another embodiment, a microfluidic unidirectional flow device may be provided with valve seats in both the inlet and outlet channels adjacent to an aperture in a central membrane. As shown in FIG. 4, a first channel 158 has a valve seat 180 disposed in a valve region below an aperture 160 defined in a central membrane 152. Flexible membrane 152 has an aperture 160 aligned with both a first valve seat 180 and a second valve seat 181. In operation, fluid flows was initiated in the inlet channel 158. At a sufficient pressure, the flexible membrane 152 was deflected towards the outlet channel 156, permitting fluid to flow from the first channel 158 to the second channel 156. As the pressure was increased, the flexible membrane 152 adjacent to the aperture 160 was deformed further upward until it contacted the second valve seat 181, thus restricting further fluid flow. This device effectively creates a window of operating pressure within a device, only allowing fluid flow when a minimum pressure is reached and restricting fluid flow again when a higher pressure is attained.

Figure 5:
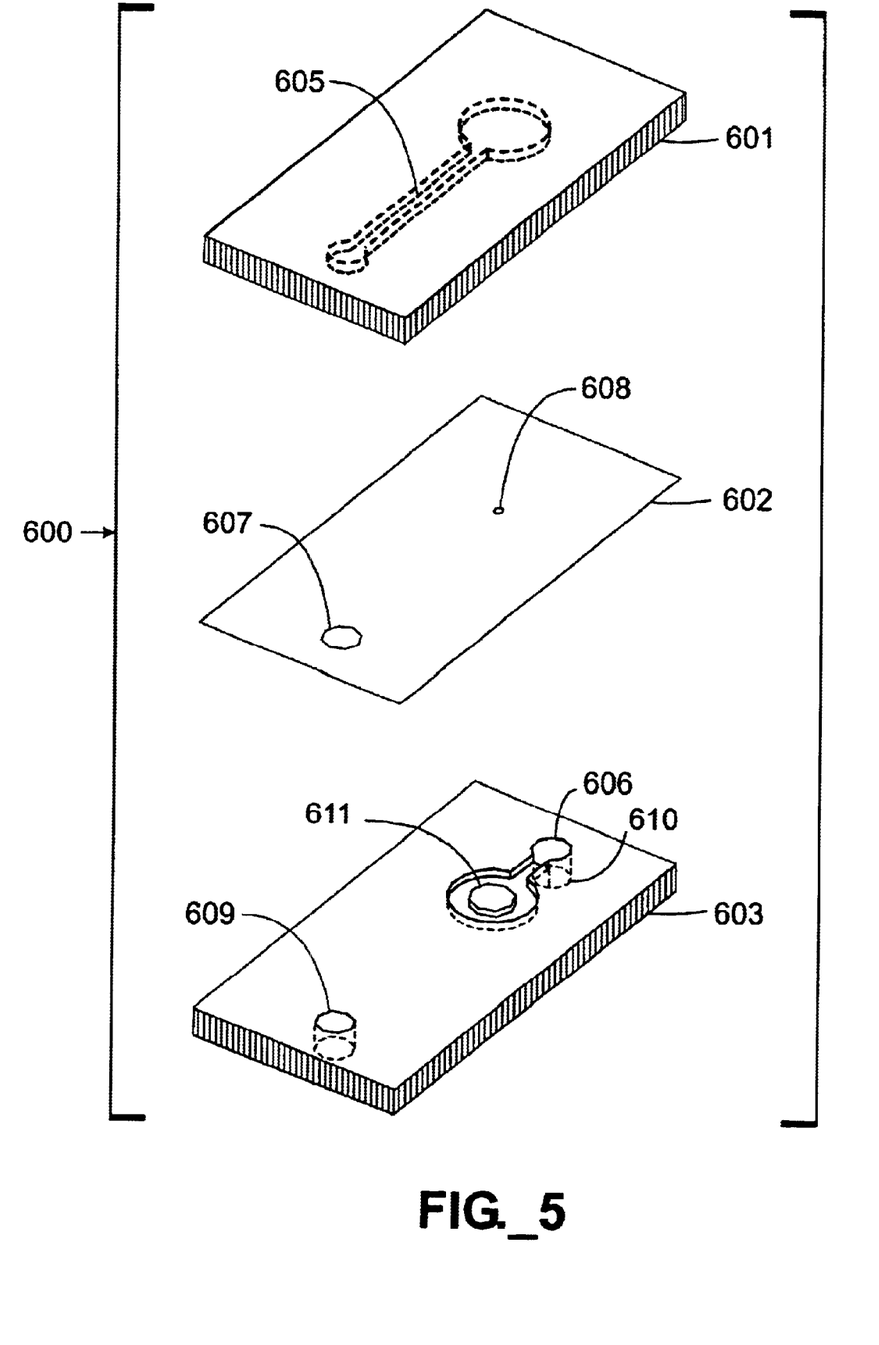
FIG. 5 is an exploded perspective view of a three-layer microfluidic flow control device having microstructures defined in the lower surface of the upper layer and in the upper surface of the lower layer.

In one embodiment, a device of the invention may be manufactured from three layers of material with microstructures formed in opposing surfaces of the upper and lower layers. Surface micromachining techniques such as those used for fabricating silicon device may be employed. For example, etching techniques may be employed. The device may be formed from materials including silicon, silicon nitride, or quartz. In one embodiment, a silicon substrate may be etched to form an inlet channel with a valve seat at the valve region. A second silicon substrate may be etched to form an outlet channel. A membrane having an aperture defined in the valve region is placed between the two silicon substrates such that the aperture is aligned with the valve seat. Such a device 600 is illustrated in FIG. 5. A first channel region 605 is formed in the lower surface of the upper substrate 601. A second channel region 606 is formed in the upper surface of the lower substrate 603, with a valve seat 611 raised within the channel 606. The lower substrate 603 further defines an inlet port 609 and outlet port 610. A flexible membrane 602 defining a valve aperture 608 and a large via 607 is disposed between the upper and lower substrates 601, 603. The flexible membrane 602 can serve as an entire layer 102 of the device 600. The layers 601, 602, 603 of the device 600 can be affixed with an adhesive on any of the layers or other fastening techniques disclosed herein. Operation of the device 600 is substantially similar to the operation of the device 95 described in connection with FIGS. 1A–1B, except that various material layers in the device 600 have been combined and formed in silicon or similar materials.

The particular devices and construction methods illustrated and described herein are provided by way of example only, and are not intended to limit the scope of the invention. The scope of the invention should be restricted only in accordance with the appended claims and their equivalents.

What is claimed is:

1. A microfluidic fluid control device comprising:
    a plurality of device layer including a first stencil layer, a second stencil layer, and a flexible membrane layer disposed between the first stencil layer and the second stencil layer;
    a first channel having a first valve seat disposed therein, the first channel being defined through the entire thickness of the first stencil layer; and
    a second channel being defined through the entire thickness of the second stencil layer;
    wherein the flexible membrane layer defines an aperture aligned with the first valve seat.

2. The microfluidic fluid control device of claim 1, further comprising a second valve seat disposed in the second channel.

3. The microfluidic flow control device of claim 2 wherein the aperture is aligned with the second valve seat.

4. The microfluidic flow control device of claim 3, wherein device allows fluid flow through the aperture at a first operating pressure but restricts fluid flow through the aperture at a second operating pressure, the second operating pressure being greater than the first operating pressure.

5. The microfluidic fluid control device of claim 1, wherein the first valve seat has a first seating surface, and the aperture is smaller than the first seating surface.

6. The microfluidic fluid control device of claim 1, wherein the first channel has a first height, the first valve seat has a second height, and the second height is substantially the same as the first height.

7. The microfluidic fluid control device of claim 1, wherein the first channel has a first height, the first valve seat has a second height, and the second height is substantially greater than the first height.

8. The microfluidic fluid control device of claim 1, wherein the first channel has a first height, the first valve seat has a second height, and the second height is substantially less than the first height.

9. The microfluidic fluid control device of claim 1, wherein the flexible membrane layer comprises a polymer.

10. The microfluidic fluid control device of claim 9, wherein the polymer is selected from the group consisting of latex, rubber, polyesters, polycarbonates, polyalkanes, polyalkenes, polytetrafluoroethylenes, polypropylenes, polyimides, polymethylmethacrylates, silicones and polyesters.

11. The microfluidic fluid control device of claim 1, wherein the device allows fluid flow in one direction, but substantially blocks fluid flow in the opposing direction.

12. A microfluidic pump comprising:
a first fluid control device of claim 11;
a second fluid control device of claim 9; and
an expandable reservoir separating the first fluid control device and the second fluid control device;
wherein the first fluid control device and the second fluid control device are oriented such that fluid can flow only in one direction through the pump.

13. The microfluidic pump of claim 12, wherein the expandable reservoir includes a piston and cylinder assembly.

14. The microfluidic pump of claim 12, wherein the expandable reservoir comprises a closed reservoir having a deformable membrane.

15. The microfluidic pump of claim 14, further comprising an actuator for moving the deformable membrane.

16. The microfluidic pump of claim 15, wherein the actuator comprises an enclosed chamber and a pressure regulation device.

17. The microfluidic pump of claim 15, wherein the actuator is a mechanical actuator.

18. The microfluidic fluid control device of claim 1, wherein the first stencil layer and second stencil layer comprise silicon, silicon nitride, quartz, glass, ceramic, metallic, or polymeric materials.

19. The microfluidic flow control device of claim 1, wherein at least one of the first channel and the second channel have at least one dimension less than about 500 microns.

20. The microfluidic flow control device of claim 1, wherein the flexible membrane layer is elastic.

21. A microfluidic device comprising:
a first stencil layer;
a second stencil layer;
a flexible membrane disposed between the first stencil layer and the second stencil layer, the flexible membrane defining an aperture;
a first channel defined through the entire thickness of the first stencil layer;
a second channel define through the second stencil layer; and
a valve seat disposed within the first channel, the valve seat having a seating surface;
wherein the aperture is aligned with the valve seat and permits selective fluid communication between the first channel and the second channel.

* * * * *